(12) United States Patent
Pittatore et al.

(10) Patent No.: US 11,204,013 B2
(45) Date of Patent: Dec. 21, 2021

(54) METHOD AND SYSTEM FOR COMBUSTION CONTROL IN A COMBUSTION CHAMBER OF AN INTERNAL COMBUSTION ENGINE

(71) Applicant: FPT INDUSTRIAL S.P.A., Turin (IT)

(72) Inventors: Roberto Pittatore, Turin (IT); Francesco Sanarico, Druento (IT)

(73) Assignee: FPT INDUSTRIAL S.P.A., Turin (IT)

( * ) Notice: Subject to any disclaimer, the term of this patent is extended or adjusted under 35 U.S.C. 154(b) by 106 days.

(21) Appl. No.: 16/605,772

(22) PCT Filed: May 23, 2018

(86) PCT No.: PCT/IB2018/053650
§ 371 (c)(1),
(2) Date: Oct. 16, 2019

(87) PCT Pub. No.: WO2018/215946
PCT Pub. Date: Nov. 29, 2018

(65) Prior Publication Data
US 2021/0040930 A1    Feb. 11, 2021

(30) Foreign Application Priority Data
May 23, 2017   (IT) ................ 102017000055908

(51) Int. Cl.
F02D 35/02    (2006.01)
F02D 41/14    (2006.01)
(Continued)

(52) U.S. Cl.
CPC .......... *F02P 17/12* (2013.01); *F02D 41/1498* (2013.01); *F02P 5/1526* (2013.01);
(Continued)

(58) Field of Classification Search
CPC .............. F02D 35/021; F02D 41/1498; F02D 2200/0418; F02D 2200/1015;
(Continued)

(56) References Cited

U.S. PATENT DOCUMENTS

| 4,463,729 A | * | 8/1984 | Bullis | ............... F01B 9/047 |
| | | | | 123/478 |
| 5,241,937 A | * | 9/1993 | Kanehiro | ............ F02P 17/12 |
| | | | | 123/406.27 |

(Continued)

FOREIGN PATENT DOCUMENTS

| JP | S5710770 | 1/1982 |
| WO | WO2012085094 | 6/2012 |

OTHER PUBLICATIONS

Patent Cooperation Treaty, International Search Report and Written Opinion for International Application No. PCT/IB2018/053650, dated Sep. 21, 2018, 16 pages.
(Continued)

*Primary Examiner* — Erick R Solis
(74) *Attorney, Agent, or Firm* — McCracken & Gillen LLC (57) ABSTRACT

A method for ignition control in a combustion chamber of an internal combustion engine by means of acquiring an electric signal relating to ionizing currents emitted in said combustion chamber, comprising a step of detecting a substantially stepped trend of said electric signal and a consequent step of inhibiting a corrective action of an ignition advance and/or of a fuel injection limitation curve in the combustion chamber.

13 Claims, 4 Drawing Sheets

(51) Int. Cl.
*F02P 5/15* (2006.01)
*F02P 17/12* (2006.01)
*F02P 5/152* (2006.01)
*G01M 15/11* (2006.01)
*G01L 23/22* (2006.01)
*F02D 41/28* (2006.01)

(52) U.S. Cl.
CPC ............ *G01L 23/226* (2013.01); *G01M 15/11* (2013.01); *F02D 35/021* (2013.01); *F02D 2041/286* (2013.01); *F02D 2200/0418* (2013.01); *F02D 2200/1015* (2013.01); *F02P 5/1502* (2013.01); *F02P 2017/125* (2013.01)

(58) Field of Classification Search
CPC .............. F02P 5/1526; F02P 2017/125; F02P 2017/128; G01L 23/226; G01M 15/11
USPC ........ 73/114.08, 114.67; 123/406.14, 406.27
See application file for complete search history.

(56) References Cited

U.S. PATENT DOCUMENTS

| | | | | |
|---|---|---|---|---|
| 5,694,900 | A | 12/1997 | Morita et al. | |
| 5,769,049 | A * | 6/1998 | Nytomt | F02D 35/021 123/435 |
| 5,811,670 | A | 9/1998 | Hubert | |
| 6,615,645 | B1 | 9/2003 | Butler, Jr. et al. | |
| 6,827,061 | B2 * | 12/2004 | Nytomt | F02D 35/023 123/406.27 |
| 7,007,661 | B2 * | 3/2006 | Warlick | F02D 35/027 123/27 GE |
| 7,707,992 | B2 * | 5/2010 | VanDyne | F02D 41/38 123/435 |
| 7,798,125 | B2 * | 9/2010 | Barrett | F02P 5/1522 123/406.37 |
| 2002/0007818 | A1 | 1/2002 | Lodise et al. | |
| 2004/0084018 | A1 | 5/2004 | Zhu | |
| 2004/0084021 | A1 * | 5/2004 | Zhu | F02D 35/027 123/406.27 |
| 2004/0084025 | A1 * | 5/2004 | Zhu | F02P 3/0453 123/435 |
| 2005/0114012 | A1 | 5/2005 | Zhu | |
| 2008/0053406 | A1 * | 3/2008 | Viele | F02D 35/021 123/406.27 |
| 2008/0078359 | A1 | 4/2008 | Barrett et al. | |
| 2015/0007642 | A1 * | 1/2015 | Angeby | F02P 5/151 73/114.01 |
| 2016/0084174 | A1 * | 3/2016 | Bengtsson | F02P 5/152 701/105 |

OTHER PUBLICATIONS

M. Hellring et al, Ion Current Based Pressure Peak Detection Under Different Air Humidity Conditions, retrieved Feb. 21, 2018, 5 pages.
Office Action issued in the counterpart Chinese application No. 201880033396.6 dated Mar. 10, 2021, including English translation (15 pages).

* cited by examiner

METHOD AND SYSTEM FOR COMBUSTION CONTROL IN A COMBUSTION CHAMBER OF AN INTERNAL COMBUSTION ENGINE

CROSS-REFERENCE TO RELATED APPLICATIONS

This application claims priority to PCT International Application No. PCT/IB2018/053650 filed on May 23, 2018, which application claims priority to Italian Patent Application No. 102017000055908 filed on May 23, 2017, the disclosures of which are expressly incorporated herein by reference.

STATEMENT RE: FEDERALLY SPONSORED RESEARCH/DEVELOPMENT

Not applicable.

TECHNICAL FIELD OF THE INVENTION

The invention relates to the field of measurement of ionizing currents inside a combustion chamber of an internal combustion engine and, in particular, it relates to a method and to the relative devices to evaluate and control detonation inside at least one cylinder of an internal combustion engine.

STATE OF THE ART

The detonation of the air-fuel mixture in the cylinder of an internal combustion engine causes vibrations and can damage the engine in case said vibrations are high.

This natural ignition condition, which causes these harmful vibrations, is usually called "knock".

These vibrations can be detected both by means of piezoelectric sensors and through the measurement of ionizing currents.

Based on the detection of the vibrations, a procedure for the correction of the spark advance is usually carried out in order to reduce said dangerous vibrations.

The measurement of ionizing currents inside the combustion chamber of an internal combustion engine is known. An example is DE19912376.

The analysis of ionizing currents can give an indication of the combustion taking place in the combustion chamber.

When the humidity contained in the air is significant, it can occur, especially in turbocharged engines, that humidity is sucked.

Some analysis methods based on ionizing currents can mistakenly take an advanced ignition for a presence of humidity, thus wrongly correcting the spark advance, which leads to an overheating of the exhaust valves and of the exhaust gas after-treatment device (ATS).

SUMMARY OF THE INVENTION

The object of the invention is to indicate a method to identify the presence of humidity in the combustion chamber.

The idea on which the invention is based is that of recognizing the presence of humidity in a cylinder of the internal combustion engine and of inhibiting a correction of the ignition control and/or of the fuel injection in the internal combustion engine.

The presence of humidity, according to the invention, is detected by recognizing a stepped waveform of the ionizing currents emitted in the combustion chamber. Generally speaking, this trend takes develops over a timeframe following the trigger of the spark up to a subsequent event, which usually coincides with the activation of the circuitry, which determines, immediately after, the trigger of a new spark.

The subject-matter of the invention is a method for combustion control in a combustion chamber of an internal combustion engine by means of acquiring an electric signal relating to ionizing currents determined in said combustion chamber.

Said method comprises a step of inhibiting any corrective action carried out on the spark advances and/or on the fuel injection, when the presence of humidity is detected in said combustion chamber.

A further subject-matter of the invention is a system for ignition control in a combustion chamber of an internal combustion engine by means of acquiring an electric signal relating to ionizing currents emitted in said combustion chamber.

The claims describe preferred embodiments of the invention, thus forming an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein.

In the figures, the same numbers and the same reference letters indicate the same elements or components.

For the purposes of the invention, the term "second" component does not imply the presence of a "first" component. As a matter of fact, these terms are only used for greater clarity and should not be interpreted in a limiting manner.

DETAILED DESCRIPTION OF EMBODIMENTS

Figure 1:
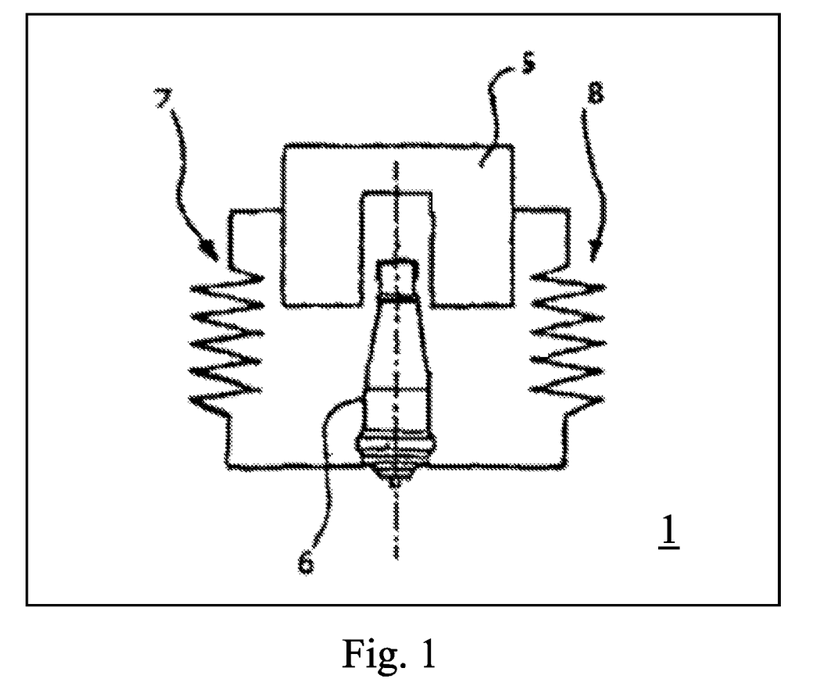
FIG. 1 schematically shows a spark plug connected to electric circuits allowing signals of ionizing currents to be acquired.

FIG. 1 shows the spark plug 6, which, besides creating the spark needed to obtain the combustion of the air/fuel mixture inside the cylinder, emits an ionizing current, which is indispensable to perform the method according to the invention.

The coil 5 schematically indicates the circuitry needed to generate the spark in the spark plug 6. There usually are a signal polarization circuit 7 and a signal acquiring circuit 8 relating to the ionizing currents emitted in the combustion chamber.

Nevertheless, type of circuitry used is irrelevant for the purposes of the invention.

Figure 5:
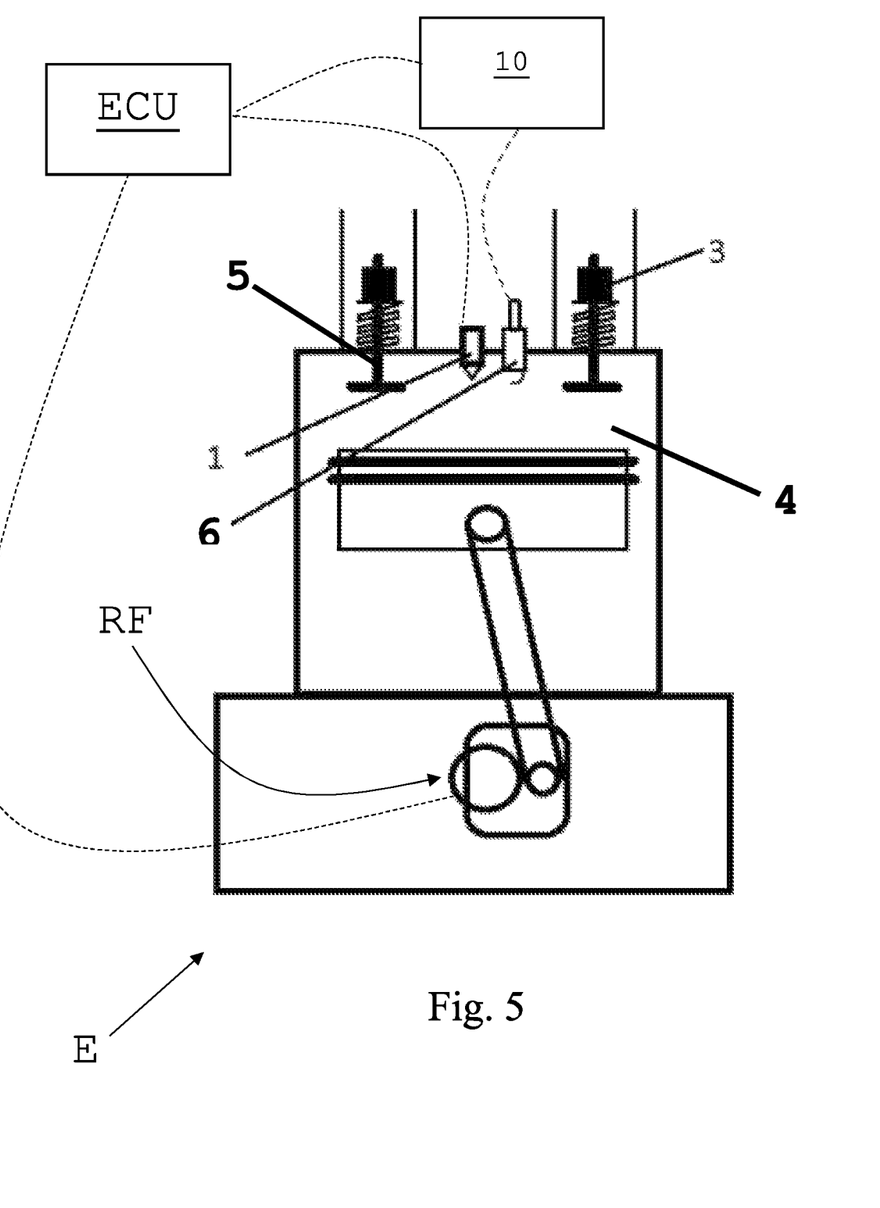
FIG. 5 schematically shows a spark-ignition internal combustion engine according to the invention.

Whet matters is the ability of acquiring a signal representing the ionizing currents developing in the combustion chamber 4 shown in FIG. 5.

FIG. 5 schematically shows a spark-ignition internal combustion engine E.

It comprises a piston coupled to a cylinder and to a relative crank mechanism, which allows it to axially slide in the cylinder, thus identifying the aforesaid combustion chamber.

At least one intake valve 3 allows fresh air to be taken in and at least one exhaust valve 5 permits the expulsion of exhaust gases.

The valves 3 and 5, together with the injector 1 and the spark plug 6 are associated with the head of the engine.

The injector 1 can be placed somewhere else, for example in a pre-combustion chamber or on an intake manifold of the internal combustion engine.

Block 10 preferably comprises the coil 5 and the acquiring circuit 8.

Block 10 is operatively connected to a processing unit ECU, which controls the injection of fuel into the combustion chamber.

Figure 2:
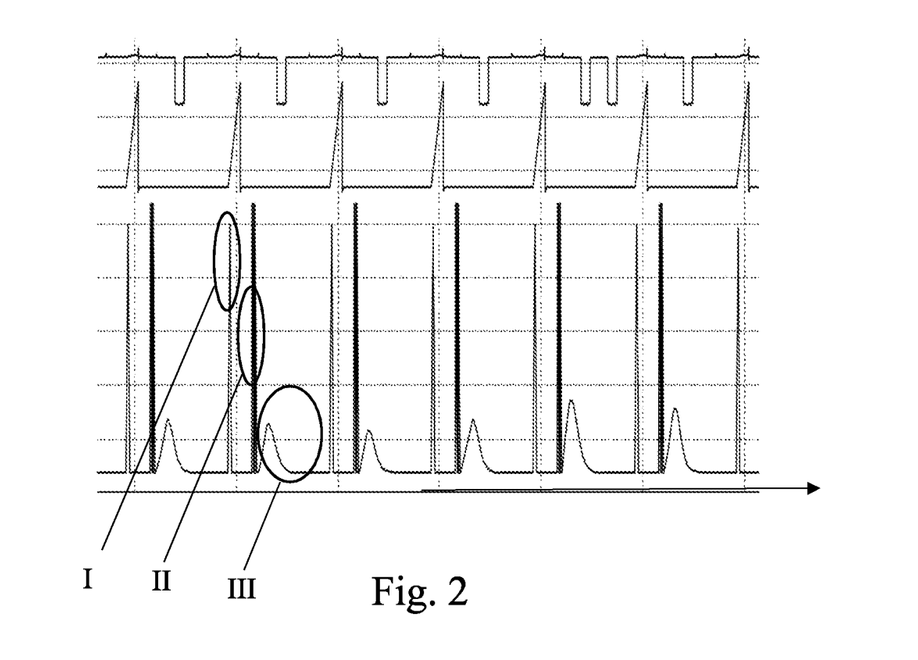
FIG. 2 shows a time diagram of signals including the ionizing currents detected in a cylinder operating under normal operating conditions.

FIG. 2 shows a time diagram of three electric signals, namely periodic signals.

The first one from the top has a train of steps and represents the electric signal relating to a sensor detecting the angular position of the camshaft arranged in the head of the internal combustion engine to which the method is applied. This sensor is a variable reluctance sensor (VRL) or a Hall sensor and is usually called "phase sensor".

It is used together with the information coming from a "revolution sensor", which is similar to the phase sensor and is associated with a phonic wheel RF, which has "60-2 teeth" and is fitted on the drive shaft. The phase sensor is used in the first cranking phases of the engine so as to perform a correct synchronization of the engine and identify the cylinder where to carry out the first fuel injection. The phase sensor is always used, but, as the relative signal is very thick, it is not shown in FIG. 2 for greater clarity; however, it is evident that the signal of the revolution sensor is correlated with the signal of the phase sensor.

The information coming from the revolution sensor, together with other pieces of information handled by the engine control system, is used by the ECU (engine control unit) to adjust fuel injection times in the combustion chamber as well as ignition times, namely the controlling of the spark plug by the aforesaid circuitry 5.

The second signal, in the shape of a train of linear ramps, represents the charge signal of the circuitry 5 used to control the generate the spark ignition of the internal combustion engine.

The third signal, which is also periodic, represents a time diagram synchronized with the previous signals and relating to the ionizing currents developing in the combustion chamber of a cylinder due to high pressures and temperatures. This signal relating to ionizing currents varies upon variation of the operating conditions of the cylinder. In particular, in FIG. 2, it identifies a normal combustion, i.e. a "regular" combustion of the relative cylinder.

Each period of said third signal comprises different events:

(I) A first pulse (spike) corresponding to the beginning of a corresponding linear ramp of the second activation signal of the circuitry 5;

(II) the trigger of the spark producing two or more pulses very close to one another;

(III) an event characterizing the type of combustion. The third event is universally known as "thermal phase", as it does not depend on the ignition circuitry, but it only depends on the combustion conditions inside the combustion chamber.

All events I-III clearly start from the basic level (zero) of the third signal.

Events I and II are directly correlated with the charge control of the circuitry 5 controlling the ignition of the engine.

Figure 3:
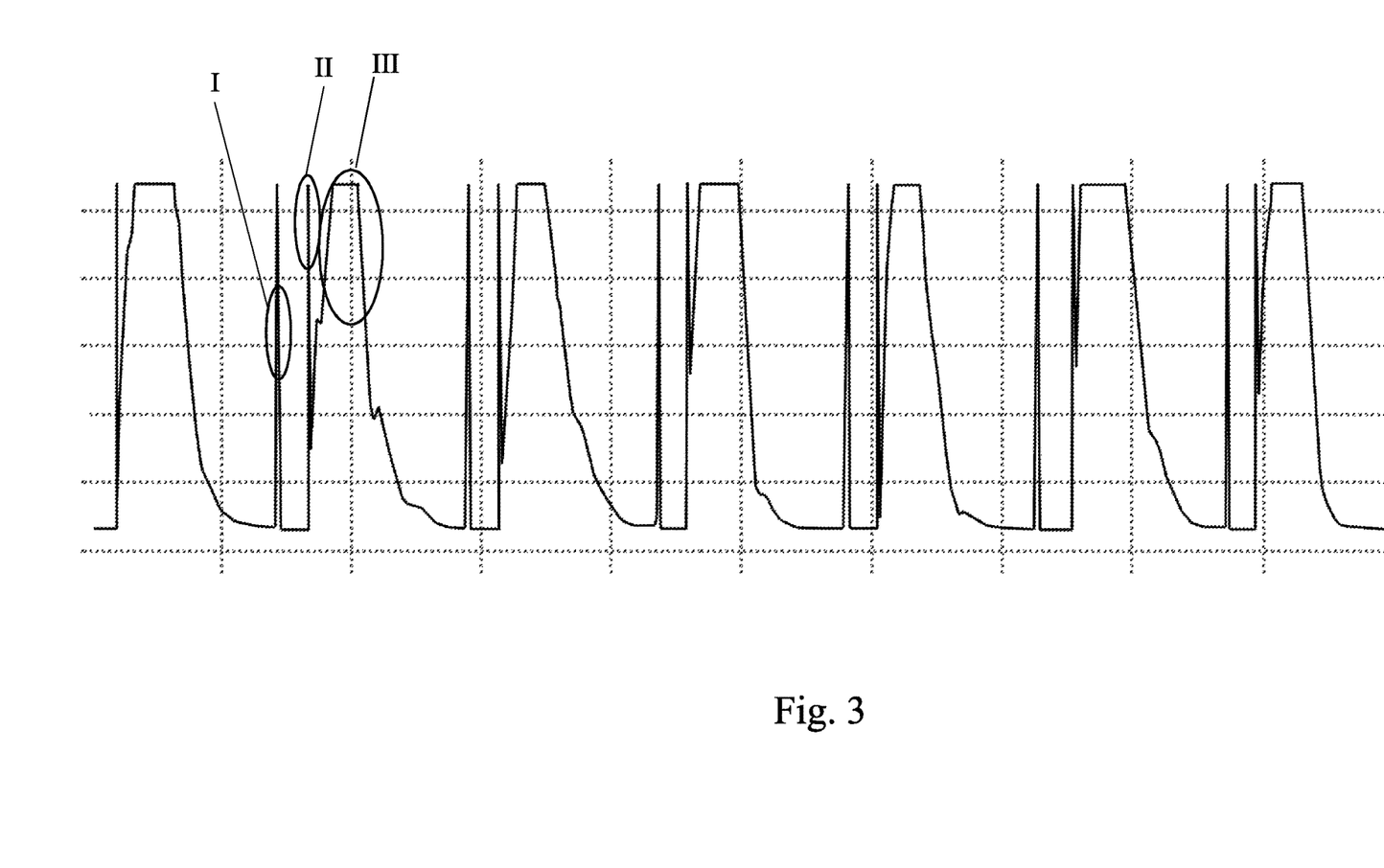
FIG. 3 shows a trend of the ionizing currents in the presence of humidity.

FIG. 3 shows a time diagram of the same signals as FIG. 2, wherein, though, the ignition takes place in the presence of humidity in the combustion chamber of the cylinder.

The second event II clearly has one or—at the most—two pulses very close together, whereas the third event, the thermal phase, is very close to the second one in time, with a substantially stepped trend.

According to the invention, the presence of humidity is acknowledged when the third event is detected to have a stepped trend. When this occurs, any correction of spark advances and/or injection advances is inhibited and preferably, immediately or upon reiteration of the same conditions, any correction previously made is cancelled. In other words, the nominal operating parameters of the engine are restored.

The time instant in which the spark is triggered is known, as it is usually controlled by the control unit of the engine ECU, based on the first signal shown in FIG. 2 and/or based on said phonic wheel; therefore, the analysis of the third signal can be limited to the time window between the second event II and the first event I of a following period.

According to a preferred embodiment of the invention, said stepped trend, relating to the third event, is acknowledged when said signal is maintained at least for a predetermined timeframe, namely when it continuously remains above a predetermined value, for example at least equal to a predetermined fraction 0.8-0.9, of a peak of the signal itself measured in the first or in the second event or of the highest peak value of the signal relating to the third event itself.

In other words, the rising edge is acknowledged and a stepped trend is acknowledged if the signal remains at least above said predetermined fraction, for example 0.8-0.9 of the peak, relating to the rise edge.

In order for this to be a step and not simply a spike, the signal needs to remain above said predetermined fraction at least for a predetermined timeframe.

According to a preferred variant of the invention, a regular sampling of the thermal phase of the signal can be carried out and said timeframe subtended by said stepped trend can be measured, for example by counting the number of samples having a value that exceeds said predetermined threshold.

The signal can be windowed in the timeframe following the second event II until the subsequent first event I and the aforesaid steps can be carried out, or the same signal can be kept from being windowed by using an algorithm that directly acknowledges the stepped trend and the time of persistence of the signal at the maximum value of the scale.

By so doing, the first and the second event are automatically excluded from the detection.

In particular, the algorithm can monitor the entire signal representing the ionizing currents and acknowledge the rising wave edge and the falling wave edge of the signal, hence without carrying out a windowing.

For example, it is possible to measure the timeframe in which the signal exceeds a predetermined amplitude threshold; when said timeframe exceeds a time threshold or a fraction of period of the signal itself, then this indirectly means that the signal is assuming a stepped shape.

Figure 4:
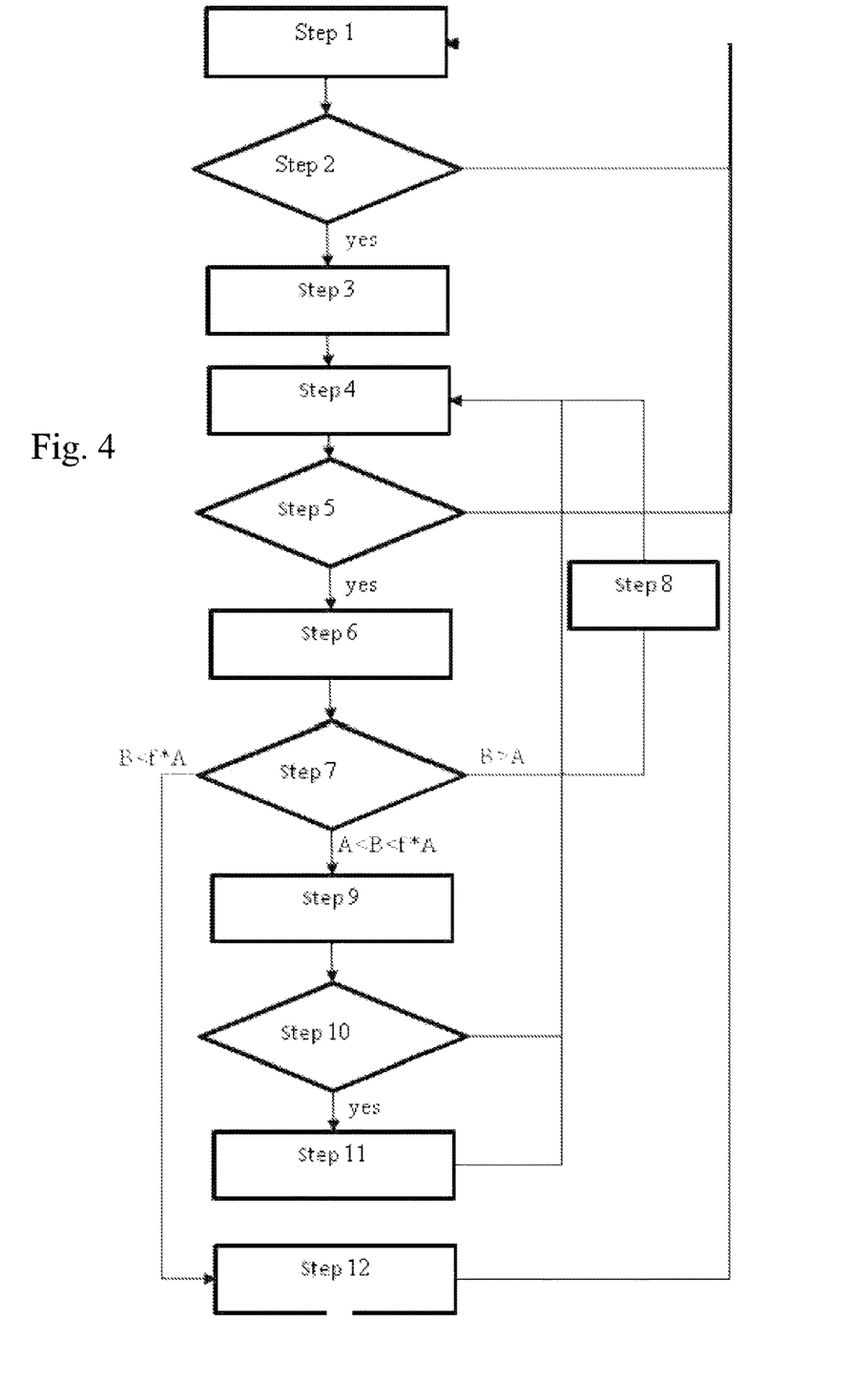
FIG. 4 shows a flowchart representing an example of the method according to the invention.

The implementing example described below, with reference to FIG. 4, can be used with or without windowing: In order to implement this example, it is necessary to use a few memory records, carrying out the following steps in succession:

Step 1: acquiring a first sample,

Step 2: verifying whether it is greater than the basic (zero) value, in which case it is considered (yes), otherwise it is discarded (no) and the procedure starts again from the beginning, Step 3: if the sample is considered (yes), it is stored in a first and in a second memory register, Step 4: acquiring a further sample and Step 5: verifying whether it is greater than the basic (zero) value, in which case it is considered (yes), otherwise (no) the procedure goes back to step 1, Step 6: if the further sample is considered, it is stored in said second register and Step 7: verifying whether the further sample is greater than the value contained in the first register, or whether it is smaller than the value of the first register, but above said predetermined fraction of the value contained in the first register, then Step 8: if it is greater than the value contained in the first register (B>A), then it is stored in the first register and the procedure goes back to step 4, otherwise Step 9: if it is smaller than the value of the first register, but above said predetermined fraction of the value contained in the first register, a counter is incremented by one, then Step 10: verifying whether the counter exceeds a predetermined threshold, Step 11: if the counter exceeds a predetermined threshold (yes), enabling a flag and going back to step 4, otherwise directly going back to step 4;

Step 12: if, instead, said further sample has a value that is smaller than said fraction of the value contained in the first register, resetting said counter, disabling the flag and going back to step 1.

The threshold used for the counter is equivalent to a time threshold, as the steps described above are carried out in discrete time according to a predetermined sampling interval. In FIG. 4, f*A indicates the value contained in the first register multiplied by a coefficient f smaller than one, so as to obtain the aforesaid fraction. This coefficient can be, for example, 0.8-0.9.

When the flag is enabled, this means there is a stepped waveform identifying the presence of humidity and, therefore, any correction of the spark advances of the relative cylinder is inhibited and, preferably, any correction of the supply of the cylinder itself is inhibited, as well.

The minimum timeframe, i.e. the aforesaid time threshold, in which the signal remains above the aforesaid amplitude threshold, preferably is at least equal to the timeframe dividing the first event from the second event under normal conditions, namely not in the presence of humidity.

In this way, even if a high amplification gain is selected, it is possible to leave out of the analysis the stepped form consequently assumed by the first and the second event.

Depending on the adopted sampling time, it is possible to easily calculate the minimum time to be reached by said counter in order to detect said stepped trend, namely in order to enable the flag.

Preferably, in order to take into account the rotation of the engine, it is possible to work in terms of period fraction. In other words, if the thermal phase generally takes up 60% of the entire period, in case the signal exceeds a predetermined amplitude threshold for 55% of the entire period, then there definitely is a stepped waveform, which, therefore, is indirectly detected without windowing.

According to a further variant of the invention, rather than sampling the signal, the aforesaid windowing is performed and then a fairly restrictive low-pass filtering is carried out in order to only save the "most continuous" component of the signal. This component is measured and compared with a predetermined threshold.

In case the value exceeds said predetermined threshold, a stepped trend is acknowledged.

It should be pointed out that there are countless alternative ways to identify said stepped trend and, therefore, these examples should not be considered as limiting.

As far as the conditioning of the signal is concerned, it is not essential to have a variable-gain amplifier, as said stepped trend is preferably detected with the same gain used to detect the "regular" trend shown in FIG. 2, namely in the absence of humidity.

This amplification gain is generally selected in such a way that, under normal engine operating conditions, the third event has a peak that is at least equal to or greater than ⅕ of the maximum acquiring amplitude.

The greater the gain, the more time-extended is the step detected under humidity conditions. Therefore, it is simple to find a right compromise between the amplification gain and the amplitude of the step representing the presence of humidity.

Indeed, FIGS. 2 and 3 are obtained by acquiring electric signals relative to ionizing currents with a same amplification gain.

According to any one of the examples described herein, the considered signal threshold can be referred to a measured peak, or it can be predetermined based on the amplification gain of the circuitry acquiring the signal representing the ionizing currents. Therefore, rather than comparing the third event with a fraction of the rising edge or with a fraction of the other events, a fixed threshold can be set, which is a function of the amplification gain.

The algorithms used to analyze the signals are preferably implemented in a properly configured control unit, which is associated with the circuitry needed for the acquisition of an electric signal indicating ionizing currents. An example of said circuitry is shown in DE19912376.

Hence, if the engine is provided with a suitable circuitry and/or with processing means configured to correct the spark advance based on the acknowledgement of a spontaneous ignition, then said processing means are inhibited from carrying out said correction.

The same concept can be adopted when a single processing unit is used both to detect the presence of humidity and to face the occurrence of spontaneous ignition. In this case independent processes (threads) can be used, in which the process concerning the acknowledgement of the presence of humidity, according to the invention, inhibits the correction of spark advances and/or of fuel injection by a spontaneous ignition acknowledgement process.

For example, in FIG. 5, block 10 includes the circuitry and the coil of FIG. 1, but it can also comprise autonomous processing means to determine the presence of humidity in the cylinder/s and detect spontaneous ignitions. Alternatively, the processing means are all gathered in the engine control unit ECU.

In other words, the spark advance is maintained unchanged, for example relative to a previous correction, or any prior correction is cancelled.

The value of the spark advance usually is variable within a predetermined angular interval of approximately +/−5 degrees relative to the position of the camshaft, which can be indirectly obtained from the position of the drive shaft or by means of a phase sensor generally associated with the first cylinder of the internal combustion engine.

Some detonation control systems also envisage correcting a curve limiting the injection of fuel into the combustion chamber. In this case, according to a preferred variant of the invention, which can be combined with the previous one, when said stepped trend—namely the presence of humidity in the combustion chamber—is acknowledged, there is an inhibition of any correction of said curve limiting the injection of fuel into the combustion chamber, for example relative to a previous correction, or any prior correction is cancelled.

If the internal combustion engine is provided with two or more cylinders, this control preferably is carried out for each cylinder independently of the other cylinders.

Indeed, the geometry of the intake ducts is not always symmetrical for all cylinders and, therefore, the condensate or the water gathering in the intake duct can be sucked from a sub-set of cylinders making the internal combustion engine, rather than from all cylinders.

This invention can be advantageously implemented by means of a computer program comprising encoding means for carrying out one or more steps of the method, when the program is run on a processing unit. Therefore, the scope of protection is extended to said computer program and, furthermore, to means that can be read by a computer and comprise a recorded message, said means that can be read by a processing unit comprising program encoding means for carrying out one or more steps of the method, when the program is run on a processing unit.

The non-limiting example described above can be subjected to variations, without for this reason going beyond the scope of protection of the invention set forth in the claims, comprising all equivalent embodiments for a person skilled in the art.

When reading the description above, a skilled person can carry out the subject-matter of the invention without introducing further manufacturing details.

The information contained in the part concerning the state of art only serves the purpose of better understanding the invention and does not represent a declaration of existence of the items described. Furthermore, if not specifically excluded by the detailed description, the information contained in the part concerning the state of art should be considered as an integral part of the detailed description of the invention.

The invention claimed is:

1. A method for ignition control in a combustion chamber of an internal combustion engine by means of acquiring (i) an electric signal representing ionizing currents emitted in said combustion chamber, the method comprising a step of selecting (ii) a portion of said signal corresponding to a thermal phase of said ionizing currents, wherein the portion is between a trigger of a spark and a subsequent activation of a generation circuitry determining a trigger of a further spark, and a step of detecting (iii) a substantially stepped trend of said portion identifying presence of humidity in the combustion chamber, and a further consequent step of inhibiting (iv) a corrective action of at least one of an ignition advance and a fuel injection limitation curve in the combustion chamber.

2. The method according to claim 1, wherein said thermal phase is detected by windowing (iii) a time interval between the trigger of a spark in said combustion chamber and the subsequent activation of the generation circuitry of said spark.

3. The method according to claim 2, comprising a further step (ii-a), subsequent to said windowing, wherein said signal including the portion is filtered by means of a low-pass filter and wherein the filtered portion is compared with a predetermined threshold and, if it results that said filtered portion exceeds said predetermined threshold, then said stepped trend is acknowledged (iii).

4. The method according to claim 1, comprising a step of measuring (ii-b) a timeframe, within said portion, in which said signal is continuously above a predetermined intensity threshold.

5. The method according to claim 4, wherein said measurement of said timeframe is performed by counting a number of consecutive samples having a respective value greater than said intensity threshold.

6. The method according to claim 4, wherein said measurement of said timeframe comprises the following steps:
(Step 1): Acquiring a first sample,
(Step 2): verifying whether this sample is greater than a basic (zero) value of said signal, if yes it is then considered, otherwise it is discarded and the measurement is started again from Step 1,
(Step 3): if the sample is considered, storing said sample in a first and in a second memory register,
(Step 4): acquiring a further sample and
(Step 5): verifying whether this further sample is greater than the basic (zero) value of said signal, if yes it is then considered, otherwise the measurement is started again from Step 1;
(Step 6): if the further sample is considered, storing it in the second register and
(Step 7): verifying whether it is greater (B>A) than the value contained in the first register, or is less than the value of the first register, but above a predetermined fraction of the value contained in the first register then
(Step 8): if it is greater than the value contained in the first register (B>A) then it is stored in the first register and it returns for the acquisition of an additional value (step 4), otherwise,
(Step 9): if it is less than the value of the first register, but above said predetermined fraction of the value contained in the first register, incrementing a counter by one, then
(Step 10): verifying whether the counter exceeds a predetermined threshold,
(Step 11): if the counter exceeds a predetermined threshold, enabling a flag and returning to the acquisition of an additional value (step 4), otherwise returning directly to the acquisition of an additional value (step 4);
(Step 12): if, instead, said further sample has a value less than said fraction of the value contained in the first register (B<A), resetting said counter, disabling said flag and restarting from the beginning (Step 1);
wherein, when said flag in enabled, then said substantially stepped trend is detected.

7. The method according to claim 3, wherein said predetermined threshold is obtained as one of a function of a peak value of said electric signal and a function of an amplification gain applied to said electric signal.

8. The method according to claim 7, wherein said amplification gain is fixed.

9. A method for ignition control in a combustion chamber of an internal combustion engine by means of acquiring (i)

an electric signal representing ionizing currents emitted in said combustion chamber, wherein said signal is substantially periodic, the method comprising a step of measuring (ii-b) a timeframe, in which said signal is continuously above a predetermined intensity threshold, when said timeframe exceeds one of a predetermined time threshold and a predetermined fraction of said period, then a substantially stepped trend of a portion of said signal identifying presence of humidity in the combustion chamber is indirectly detected (iii) and a further consequent inhibiting step (iv) is carried out so as to inhibit a corrective action of at least one of an ignition advance and a fuel injection limitation curve in the combustion chamber.

10. The method according to claim 1, wherein, when a corrective action is inhibited, said method comprises a further step of cancelling (v) any corrective action previously carried out, taking back at least one of said ignition advance and said fuel injection limitation curve in the combustion chamber to respectively nominal values (setpoint).

11. A non-transitory computer-readable storage medium having executable instructions stored thereon that cause a processor to perform all the steps of claim 1.

12. A system for combustion control in a combustion chamber of an internal combustion engine by means of acquiring an electric signal representing ionizing currents emitted in said combustion chamber, comprising:
   a first control circuitry of said ignition,
   a second acquiring circuitry of an electric signal representing said ionizing currents emitted in said combustion chamber, and
   processing means cooperating with at least said second circuitry and configured to undertake the steps of:
   selecting a portion of said signal corresponding to a thermal phase of said ionizing currents, wherein the portion is between a trigger of a spark and a pulse or spike coinciding with a subsequent activation of a generation circuitry determining the trigger of a further spark; and
   detecting a substantially stepped trend of said portion identifying presence of humidity in the combustion chamber, and a further consequent step of inhibiting (iv) a corrective action of at least one of an ignition advance and a fuel injection limitation curve in the combustion chamber.

13. The system of claim 12, wherein the system for combustion control is a component of a spark-ignition internal combustion engine.

* * * * *